(12) United States Patent
Sang et al.

(10) Patent No.: US 10,239,010 B2
(45) Date of Patent: Mar. 26, 2019

(54) FILTER ASSEMBLY, FILTER DEVICE AND DUST COLLECTOR

(71) Applicant: SUZHOU ALTON ELECTRICAL & MECHANICAL INDUSTRY CO., LTD., Jiangsu (CN)

(72) Inventors: Shuhua Sang, Jiangsu (CN); Yuangang Gao, Jiangsu (CN)

(73) Assignee: SUZHOU ALTON ELECTRICAL & MECHANICAL INDUSTRY CO., LTD. (CN)

( * ) Notice: Subject to any disclaimer, the term of this patent is extended or adjusted under 35 U.S.C. 154(b) by 88 days.

(21) Appl. No.: 15/519,033

(22) PCT Filed: Mar. 3, 2017

(86) PCT No.: PCT/CN2017/075543
§ 371 (c)(1),
(2) Date: Apr. 13, 2017

(87) PCT Pub. No.: WO2018/086281
PCT Pub. Date: May 17, 2018

(65) Prior Publication Data
US 2018/0296962 A1    Oct. 18, 2018

(30) Foreign Application Priority Data

Nov. 8, 2016 (CN) .......................... 2016 1 0981874

(51) Int. Cl.
*A47L 9/12* (2006.01)
*B01D 46/24* (2006.01)
(Continued)

(52) U.S. Cl.
CPC ............ *B01D 46/2414* (2013.01); *A47L 9/00* (2013.01); *A47L 9/102* (2013.01); *A47L 9/127* (2013.01);
(Continued)

(58) Field of Classification Search
CPC ............ B01D 46/0005; B01D 46/2414; B01D 2265/025; B01D 2279/55; A47L 9/00; A47L 9/102; A47L 9/127
(Continued)

(56) References Cited

U.S. PATENT DOCUMENTS 3,546,853 A * 12/1970 Claar .................... B60K 15/035
                                                    220/303
3,957,639 A * 5/1976 Schoen .............. B01D 46/0068
                                                    210/107
(Continued)

FOREIGN PATENT DOCUMENTS

CN          1358477        7/2002
CN          101711657      5/2010
(Continued)

OTHER PUBLICATIONS

International Search Report issued in PCT/CN2017/075543, dated Jul. 13, 2017.

*Primary Examiner* — Frank M Lawrence, Jr.
(74) *Attorney, Agent, or Firm* — Barnes & Thornburg LLP; Jeffrey R. Stone

(57) ABSTRACT

Disclosed is a filter device, including: a filter cage, a filter cartridge sleeved at outer side of the filter cage and an end cap connected to one end of the filter cartridge; the end cap is provided with a through end hole, and one end of the filter cage corresponding to the end cap is provided with a middle column penetrating through the end hole; and the filter device further includes: a cover body installed at outer side of the end cap; where the end cap is provided with a plurality of clamping elements used for pressing against the middle column, and the cover body pushes the clamping elements to move to the middle column in a process that the cover body rotates around the middle column along a rotation
(Continued)

direction, so that the middle column is clamped by the plurality of clamping elements.

20 Claims, 16 Drawing Sheets

(51) Int. Cl.
*B01D 46/00* (2006.01)
*A47L 9/00* (2006.01)
*A47L 9/10* (2006.01)

(52) U.S. Cl.
CPC .... *B01D 46/0005* (2013.01); *B01D 2265/025* (2013.01); *B01D 2279/55* (2013.01)

(58) Field of Classification Search
USPC .......... 55/490, 492, 498, 502, 504, DIG. 15
See application file for complete search history.

(56) References Cited

U.S. PATENT DOCUMENTS

| | | | | |
|---|---|---|---|---|
| 4,948,505 | A | * | 8/1990 | Petrucci ................ B01D 35/30 |
| | | | | 210/238 |
| 5,076,918 | A | * | 12/1991 | Foust .................... B01D 27/08 |
| | | | | 210/238 |
| 5,783,086 | A | | 7/1998 | Scanlon et al. |
| 5,865,863 | A | * | 2/1999 | DeSousa ............ F02M 35/0203 |
| | | | | 123/198 E |
| 2002/0166199 | A1 | | 11/2002 | Boles et al. |
| 2006/0016044 | A1 | | 1/2006 | Wiedemann |
| 2007/0113529 | A1 | | 5/2007 | Gierer |
| 2012/0222242 | A1 | | 9/2012 | Conrad |
| 2014/0174296 | A1 | | 6/2014 | Schultz et al. |
| 2016/0106281 | A1 | | 4/2016 | Liu |

FOREIGN PATENT DOCUMENTS

| | | |
|---|---|---|
| CN | 202149311 | 8/2011 |
| CN | 202441192 | 9/2012 |
| CN | 203000807 | 6/2013 |
| CN | 203328636 | 12/2013 |
| CN | 106361223 | 2/2017 |
| CN | 106377205 | 2/2017 |
| CN | 106388705 | 2/2017 |
| CN | 106510549 | 3/2017 |
| CN | 106618380 | 5/2017 |
| EP | 0377907 | 7/1990 |
| EP | 0921748 | 4/2001 |
| JP | 2002272656 | 9/2002 |
| JP | 3639250 | 1/2005 |
| WO | 98/07361 | 2/1998 |

* cited by examiner

FILTER ASSEMBLY, FILTER DEVICE AND DUST COLLECTOR

TECHNICAL FIELD

The present disclosure relates to a filter assembly, a filter device with the assembly and a dust collector with the device.

BACKGROUND

A dust collector is a common household cleaning device and has a function of separating dust and debris from air. At present, a filter device is the most common and most effective solution of realizing separation of air and dust. The filter device often needs to be disassembled from inside of the dust collector in a using process. For example, a great deal of dust will be accumulated on the filter device after the dust collector is used for a period of time, the filter device needs to be installed again after being disassembled and cleaned, or is replaced by a new filter. An easily-disassembled filter is matched with a dust filter fence with a middle column, and is a more practical filter device. A patent (Publication No.: CN101711657) discloses a replaceable filter device, which includes a filter device bracket (i.e., a filter cage), wherein a filter is sleeved on the bracket and penetrates through an end cap with an elastic material at one end of the filter device, the end cap is provided with an end hole, a supporting column (a middle column) on the bracket penetrates through the end hole when the filter device is installed, and the end hole is kept within an area where an outer diameter of the supporting column is smaller. A patent (Publication No.: CN203328636) discloses a replaceable filter device, wherein an end cap is provided with an end hole penetrating through the end cap, a middle column on a filter bracket penetrates through the end hole, a fixing button is in thread connection to the end cap, the fixing button is provided with a plurality of claw parts in an integral extending manner, and the claw parts on the fixing button are propped open by the middle column in the process that the fixing button is in thread connection to the end cap, so that the claw parts generate greater force to the middle column to lock the middle column. A patent (Publication No.: U.S. Pat. No. 5,783,086) discloses a replaceable filter device, wherein an end cap is provided with an end hole penetrating through the end cap, a middle column on a filter bracket penetrates through the end hole of the end cap, and a fixing button is in thread connection to the middle column penetrating out of the end hole. The filters in the above solutions can be better matched with the filter cages with the middle columns, and the middle columns of the filter cages can be fast assembled/disassembled and locked. The design provides a novel solution.

SUMMARY

The problem to be solved by the present disclosure is that a filter device for conveniently and stably fixing a middle column of a filter cage arranged thereon is provided.

In order to solve the above technical problems, the present disclosure adopts the technical solution below: a filter device used in a dust collector includes: a filter cage, a filter cartridge sleeved at outer side of the filter cage and an end cap connected to one end of the filter cartridge; the end cap is provided with a through end hole, and one end of the filter cage corresponding to the end cap is provided with a middle column penetrating through the end hole; and the filter device further includes a cover body installed at outer side of the end cap; where the end cap is provided with a plurality of clamping elements used for pressing against the middle column, and the cover body pushes the clamping elements to move toward the middle column in a process that the cover body rotates around the middle column along a rotation direction, to make the middle column clamped by the plurality of clamping elements.

According to the present disclosure, in the process of rotation of the cover body, the cover body pushes the clamping elements to gradually move to the middle column, and the middle column is finally clamped; therefore, the effect of fixing the middle column is good, and the operation is convenient and fast; in addition, a state of pressing against the clamping elements of the end cap by the cover body and the middle column is formed, thereby being conductive to mutual fixation of the cover body and the end cap.

Further, the cover body is provided with a plurality of pushing parts used for pushing the clamping elements, and the pushing parts rotate along with the cover body to push corresponding clamping elements to move to the middle column in a process that the cover body rotates around the middle column along the rotation direction, to make the middle column clamped by the plurality of clamping elements.

Further, the clamping element is provided with a side surface facing away from the middle column, and the pushing part slides along the side surface of corresponding clamping element to push the side surface to push corresponding clamping element to move toward the middle column in the process that the cover body rotates around the middle column along the rotation direction.

Further, the side surface is convex surface, an area of the side surface on which the pushing part slides includes a line area in a plane vertical to an axis of the middle column; and in the line area, a vertical distance from a point slid over firstly by the corresponding pushing part along the rotation direction to the axis is less than that from a point slid over afterward by the corresponding pushing part to the axis, when the middle column is clamped by the plurality of clamping elements.

Further, the side surface is convex surface, and the clamping elements are pushed toward the middle column or the axis increasingly in the process that the cover body rotates along the rotation direction, so that a distance from the clamping element to the middle column or the axis is closer and closer, and finally, the middle column is clamped by the clamping elements.

Further, the clamping elements are overhanging arms integrally connected to the end cap.

Further, each of the clamping elements includes an elastic part integrally extending from the end cap and a clamping part further extending from the elastic part, and the clamping elements clamp the middle column by the clamping parts.

Further, each the clamping part moves to a direction facing far away from the middle column, by an effect of elastic force of corresponding elastic part, to unclamp the middle column in a process that the cover body rotates against the rotation direction.

Further, the clamping elements are provided with side surfaces facing away from the middle column, the pushing parts slide along the side surfaces of corresponding clamping elements to push the side surfaces in the process that the cover body rotates around the middle column along the rotation direction, and the side surfaces are located at the clamping parts.

Further, each of the clamping parts is provided with a concave surface facing away from the corresponding side surface, and the concave surfaces press against the middle column when the middle column is clamped by the clamping elements.

Further, each of the concave surfaces is in an arc shape adapting to outline of the middle column, and each of the clamping parts is in an arc shape projecting to the direction far away from the axis.

Further, the closer a distance from an area of the side surface of each of the clamping elements to the elastic part of the clamping element is, the closer a distance from the area to the axis is.

Further, either the end cap or the cover body is provided with a first annular rib, the other one is provided with an annular groove matched with the first annular rib, the filter device is further provided with an annular sealing ring contained in the annular groove, and the first annular rib presses against the annular sealing ring.

Further, an annular flange is arranged at periphery of the cover body, and the annular groove is arranged at the annular flange.

Further, the end cap is provided with a plurality guide elements located at inner side of the end cap and distributed at periphery of the end hole, and each of the guide elements is provided with a fourth guide bevel used for guiding the middle column to be inserted into the end hole.

Further, the end cap is provided with a sunken area located at outer side of the end cap, and the clamping elements are located within the sunken area.

Further, the end cap is integrally provided with a plurality of first side walls located at outer side thereof, and the clamping element integrally extend from corresponding first side wall.

Further, the end cap is further provided with baffles extending out of the first side walls and chutes located at inner sides of the baffles; the first side wall and the baffle form as walls of the corresponding chute; the cover body is further provided with bumps located at inner side of the cover body; the bump can rotate with the cover body along the corresponding chute, and the baffles stop the bumps to prevent the cover body from departing from the end cap.

Further, the cover body is provided with a cover plate and an annular side plate integrally connected to periphery of the cover plate; a containing cavity is formed by the side plate and the cover plate; the bumps are contained in the containing cavity and integrally extend from the side plate; and the clamping elements are contained in the containing cavity.

Further, the end cap is further provided with openings communicated with the chutes; each of the openings is located at one end of each of the baffles, and the bumps can be put into the openings along the direction parallel to the axis and then rotate into the chutes around the axis.

Further, the end cap is further provided with stopping walls used for stopping the bumps, the stopping wall and the opening are located at the two opposite ends of the corresponding chute, and the bump is limited to rotate between the stopping wall and the opening.

Further, the end cap is further integrally provided with a plurality of second side walls located at outer side of the end cap, the first side walls and the second side walls are distributed in a staggered manner, the baffles and the second side walls are distributed in a staggered manner, and each of between one end of the corresponding second side wall and one end of the corresponding baffle are spaced and the opening is formed therebetween.

Further, the end cap is further provided with stopping walls used for stopping the bumps to rotate, each of the stopping walls includes a first end side facing away from the middle column and a second end side located between the first end side and the middle column, the first side wall extends from the corresponding second end side against the rotation direction, and the second side wall extends from the corresponding first end side along the rotation direction.

Further, the clamping elements move along the direction facing away from the middle column to unclamp the middle column in the process that the cover body rotates against the rotation direction.

Further, the cover body is provided with a cover plate and an annular side plate integrally connected to periphery of the cover plate, a containing cavity is formed by the side plate and the cover plate, the cover body is provided with a plurality of pushing parts used for pushing the clamping elements, and the pushing parts are contained in the containing cavity and integrally extend upwards from the cover plate.

Further, each of the clamping elements is provided with a first stopping rib, the middle column is provided with a head portion, the clamping elements clamp the middle column by clamping the head portion, and the first stopping rib is located at an upper side of the head portion and is at least partially overlapped with a projection of the head portion along the axis when the clamping elements are in a state of clamping the head portion.

Further, the cover body is provided with a plurality of pushing parts used for pushing the clamping elements, one side of each of the pushing parts which faces to the middle column is provided with a second stopping rib, and the second stopping ribs are located at upper sides of the clamping elements and are at least partially overlapped with projections of the clamping elements along the axis when the clamping elements are in a state of clamping the middle column.

Further, each of the clamping elements is provided with a third guide bevel used for guiding the middle column to be inserted among the plurality of clamping elements, and the third guide bevel is located at lower portion of the clamping element.

Further, the cover body is provided with third stopping ribs located at lower sides of the clamping elements, the clamping elements lean against the third stopping ribs up and down, or an up-and-down gap is formed between the clamping element and the corresponding third stopping rib, and the clamping element is partially overlapped with projection of the corresponding third stopping rib along the axis.

In order to solve the above technical problems, the present disclosure may further adopt the technical solution below: a filter device used in a dust collector includes: a filter cage, a filter cartridge sleeved at the outer side of the filter cage and an end cap connected to one end of the filter cartridge; the end cap is provided with a through end hole, and one end of the filter cage which corresponds to the end cap is provided with a middle column penetrating through the end hole; the filter device further includes a cover body installed at the outer side of the end cap; the cover body is provided with a plurality of pushing parts, the end cap is provided with a plurality of clamping elements corresponding to the pushing parts, the pushing parts press against corresponding clamping elements towards the middle column when the cover body is located at a first position, so that the middle column is clamped by the plurality of clamping elements, and in a process that the cover body rotates around the middle column from the first position to a second position, the pushing parts rotate along with the cover body, and the plurality of clamping elements move toward a direction facing away from the middle column, so as to unclamp the middle column.

The problem to be solved by the present disclosure is that a dust collector with the filter device is further provided; the dust collector further includes a dust bucket and a machine head installed at an upper end of the dust bucket and provided with a motor, and the filter device is installed at a lower side of the machine head and is contained in the dust bucket.

A problem to be solved by the present disclosure is that a filter assembly which can be better adapted to a filter cage with a middle column is provided.

In order to solve the above technical problems, the present disclosure may adopt the technical solution below: a filter assembly used in a dust collector includes a hollow filter cartridge and an end cap connected to one end of the filter cartridge and used for shielding one end of the filter cartridge; the end cap is provided with a through end hole; and the filter assembly further includes a cover body installed at the outer side of the end cap, the end cap shields the end hole, the cover body can rotate around an axis penetrating through the end hole and the cover body, the cover body is provided with a plurality of pushing parts, the end cap is provided with a plurality of clamping elements corresponding to the plurality of pushing parts, each of the clamping elements is provided with a side surface facing away from the axis, and the pushing parts rotate along with the cover body and slide along the side surfaces of corresponding clamping elements, in a process that the cover body rotates around the axis along a rotation direction, so as to push the corresponding clamping elements to move toward the axis.

The characteristics and the advantages of the present disclosure will be disclosed in detail in the following specific implementation manners and drawings.

DETAILED DESCRIPTION

The technical solutions of embodiments of the present disclosure are explained and described below in combination with drawings of embodiments of the present disclosure. However, embodiments below are only embodiments of the present disclosure, but not all. Based on embodiments in implementation manners, other embodiments obtained by those skilled in the art on the premise of not doing creative work shall belong to the protection scope of the present disclosure.

Figure 1:
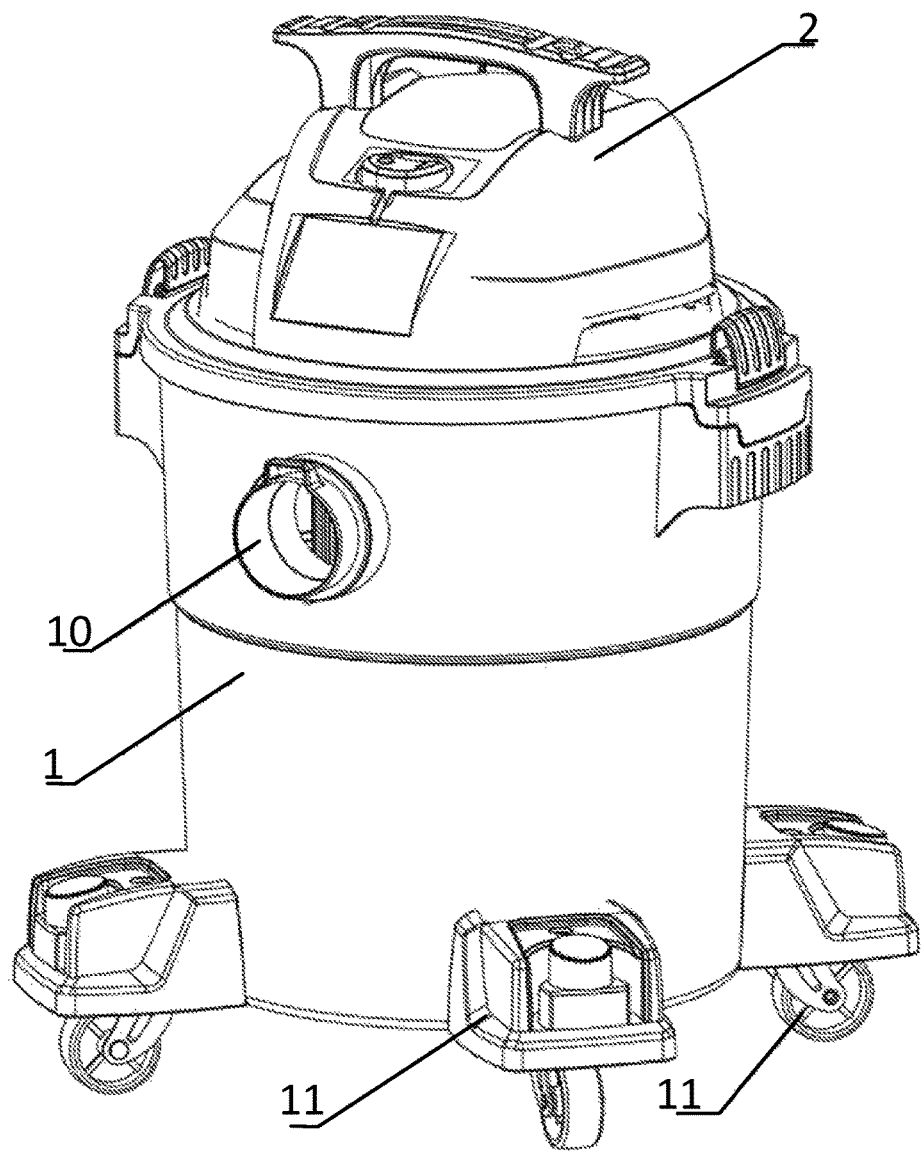
FIG. 1 is a three-dimensional diagram illustrating a dust collector of the present disclosure.
Figure 2:
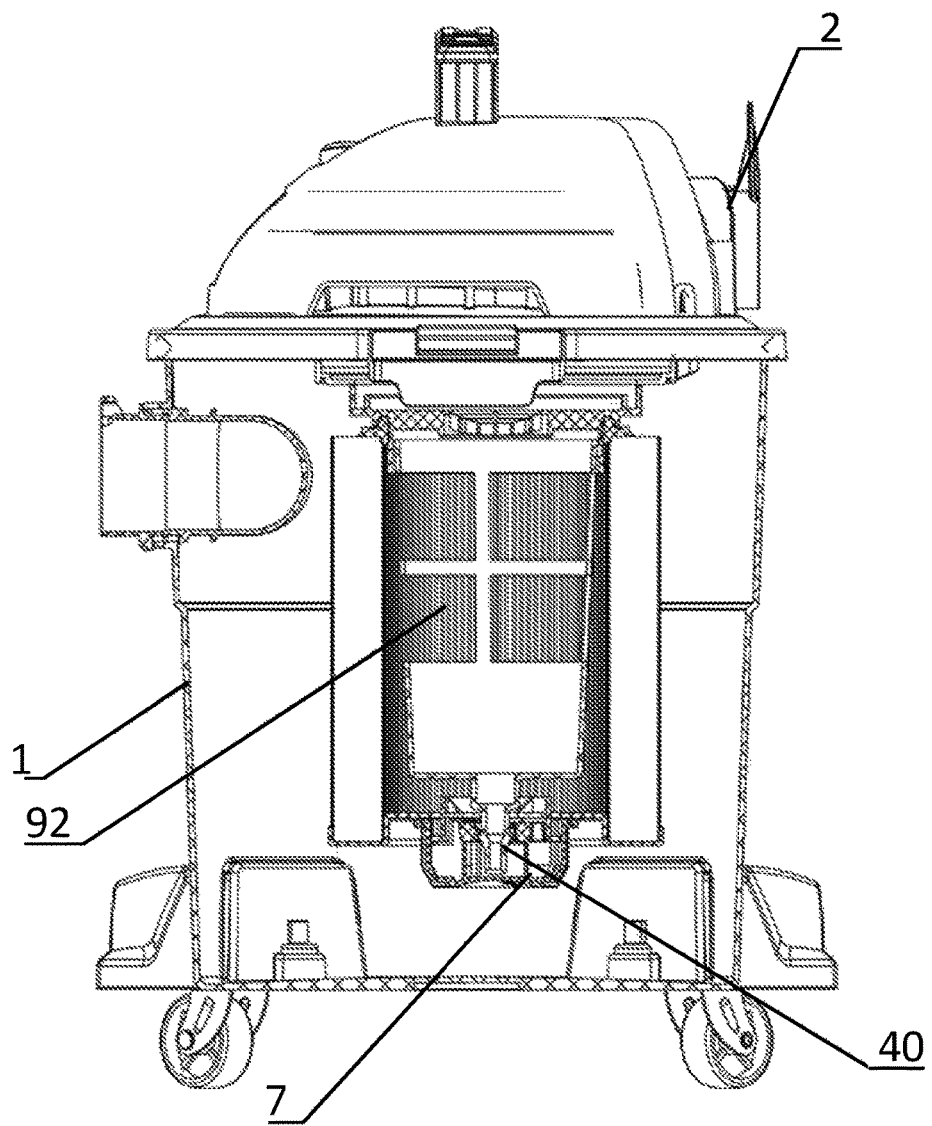
FIG. 2 is a schematic sectional diagram illustrating part of FIG. 1.
Figure 3:
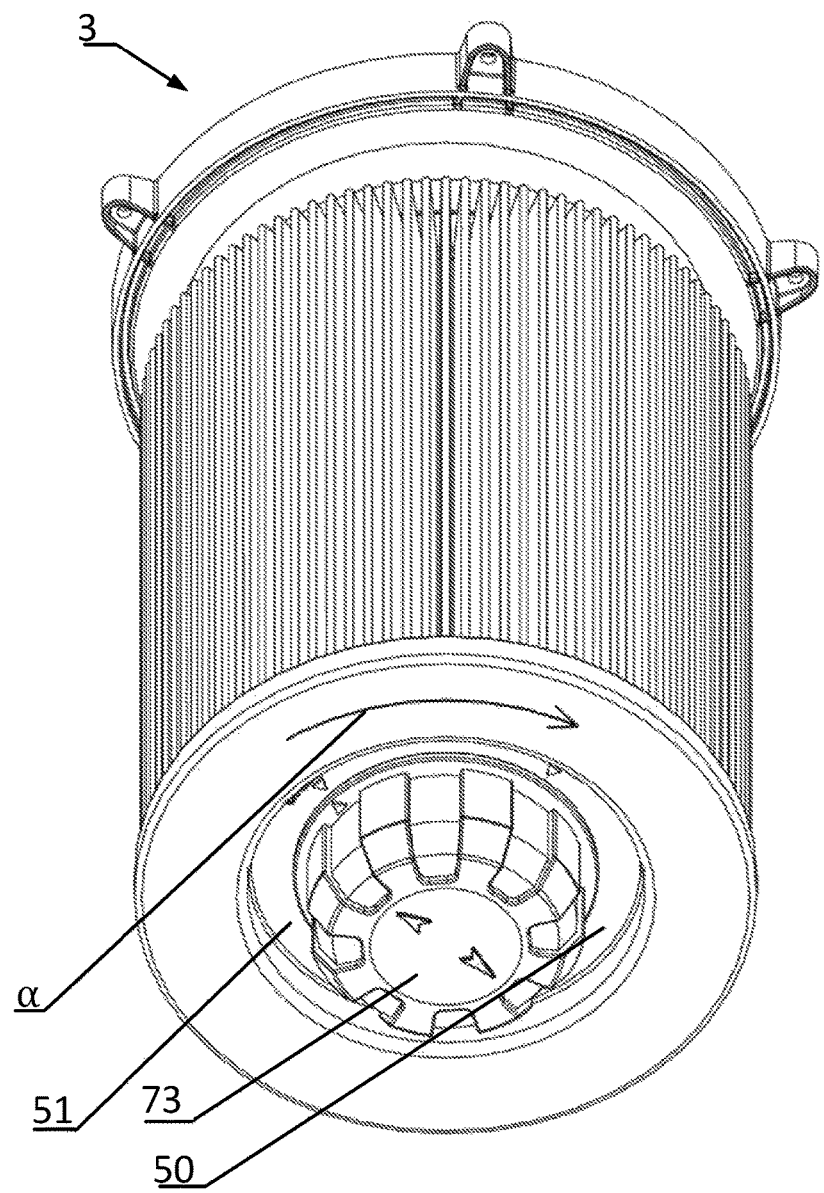
FIG. 3 is a three-dimensional diagram illustrating a filter device of the present disclosure.

As shown in FIGS. 1 to 3, a dust collector is provided with a dust bucket 1, a machine head 2 and a filter device 3. An air inlet 10 is formed for the dust bucket 1, and four casters 11 are arranged at the bottom of the dust bucket 1. The machine head 2 is arranged at the upper end of the dust bucket 1 and is provided with a motor (not shown in the figures), an impeller (not shown in the figures) and an air outlet 20. The filter device 3 is contained in the dust bucket 1, and the filter device 3 is in fluid communication between the air inlet 10 and the impeller for filtering dust. The motor drives the impeller to generate a negative pressure when the dust collector is in work, so that an air flow mingled with dust flows into the dust bucket 1 from the air inlet 10, then flows into the machine head 2 after being filtered by the filter device 3 and is discharged out of the dust collector through the air outlet 20.

As shown in FIGS. 3 to 16, the filter device 3 includes a filter cage 4, a filter cartridge 92 sleeved at the outer side of the filter cage 4, an end cap 6 connected to one end of the filter cartridge 92, a cover body 7 installed at the outer side of the end cap 6, a sealing ring 8, an end ring 90 and a tray 91. The end ring 90 and the end cap 6 are located at two opposite ends of the filter cartridge 92, the end ring 90 is connected to the upper end of the filter cartridge 92, the end ring 90 is made of a flexible material and is sealed at the periphery of the lower end of the tray 91, and the tray 91 is fixedly locked to a lower end surface of the machine head 2. The end cap 6 is provided with a through end hole 60, and one end of the filter cage 4 corresponding to the end cap 6 is provided with a middle column 40 penetrating through the end hole 60. The end cap 6 is provided with a plurality of clamping elements 61 used for pressing against the middle column 40, and the cover body 7 pushes the clamping elements 61 to move toward the middle column 40 in a process that the cover body 7 rotates around the middle column 40 along a rotation direction a, so that the middle column 40 is clamped by the clamping elements 61. According to the present disclosure, the cover body 7 pushes the clamping elements 61 to gradually move toward the middle column 40 and the middle column 40 is finally clamped in the process of the rotation of the cover body 7, thereby being convenient and fast and being easy to use; in addition, the effect of fastening the middle column 40 is good, and a state of pressing against the clamping elements 61 of the end cap 6 by the cover body 7 and the middle column 40 is formed, thereby being conductive to mutual fixation of the cover body 7 and the end cap 6. In a process that the cover body 7 rotates against the rotation direction a, the clamping elements 61 move toward a direction facing away from the middle column 40, so as to unclamp the middle column 40.

In the implementation manner, the quantity of the clamping elements 61 is two, which is only an example, and the quantity is not limited to this and can be set as required.

Figure 8:
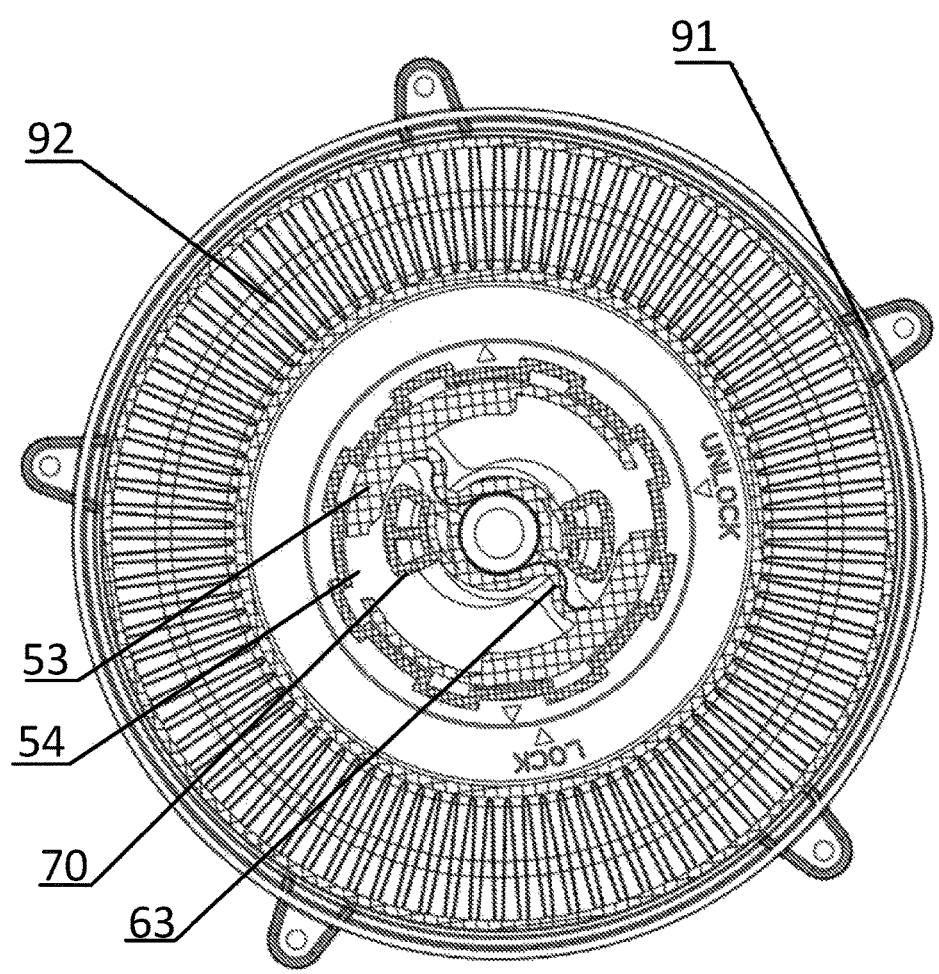
FIG. 8 is a horizontal section view of an angle of FIG. 3 (a cross section is vertical to an axis b, and a middle column is in a state of being clamped)
Figure 9:
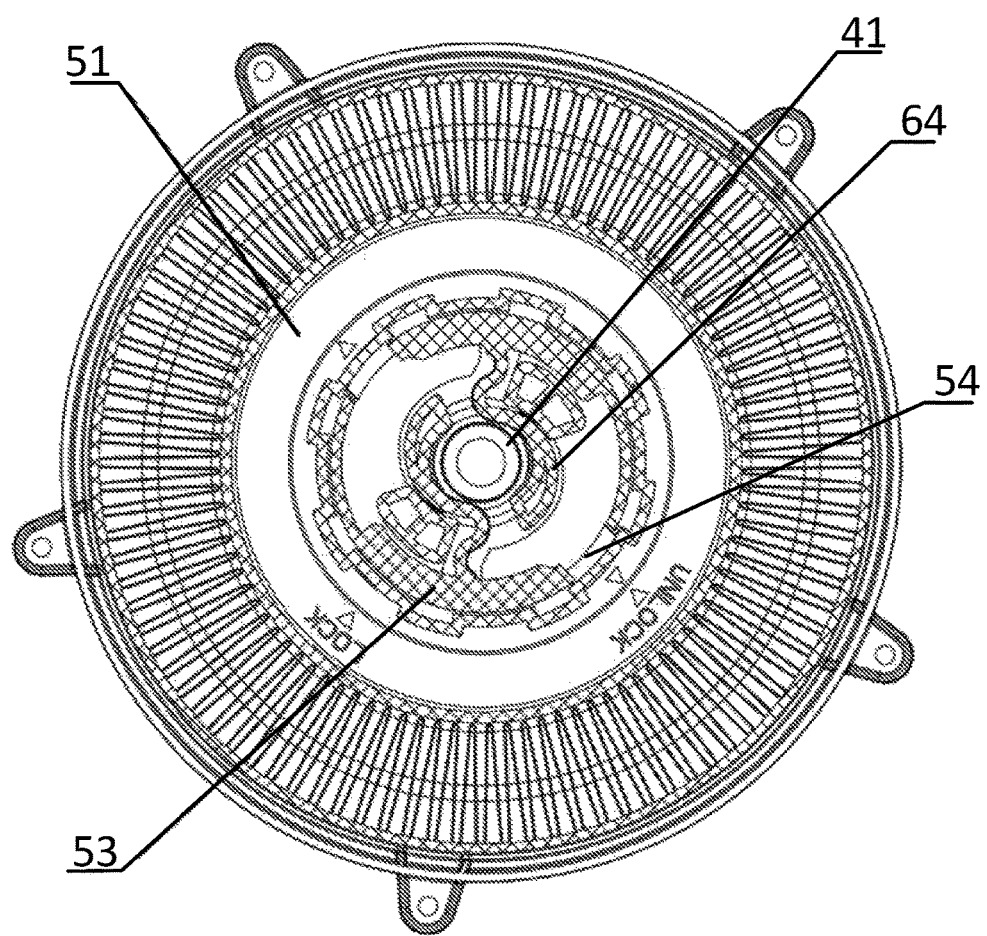
FIG. 9 is a horizontal section view of another angle of FIG. 3 (a cross section is vertical to an axis b, and a middle column is in a state of being unclamped)
Figure 10:
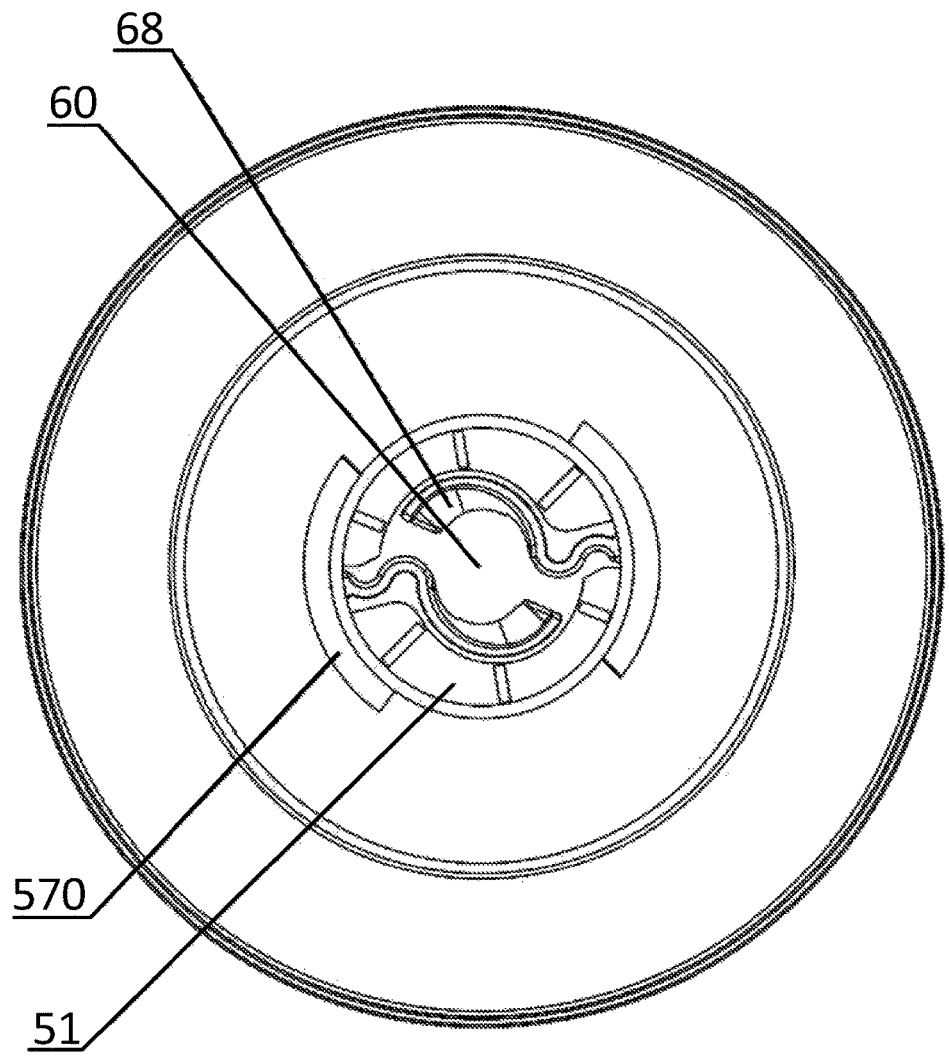
FIG. 10 is a top view illustrating an end cap.
Figure 11:
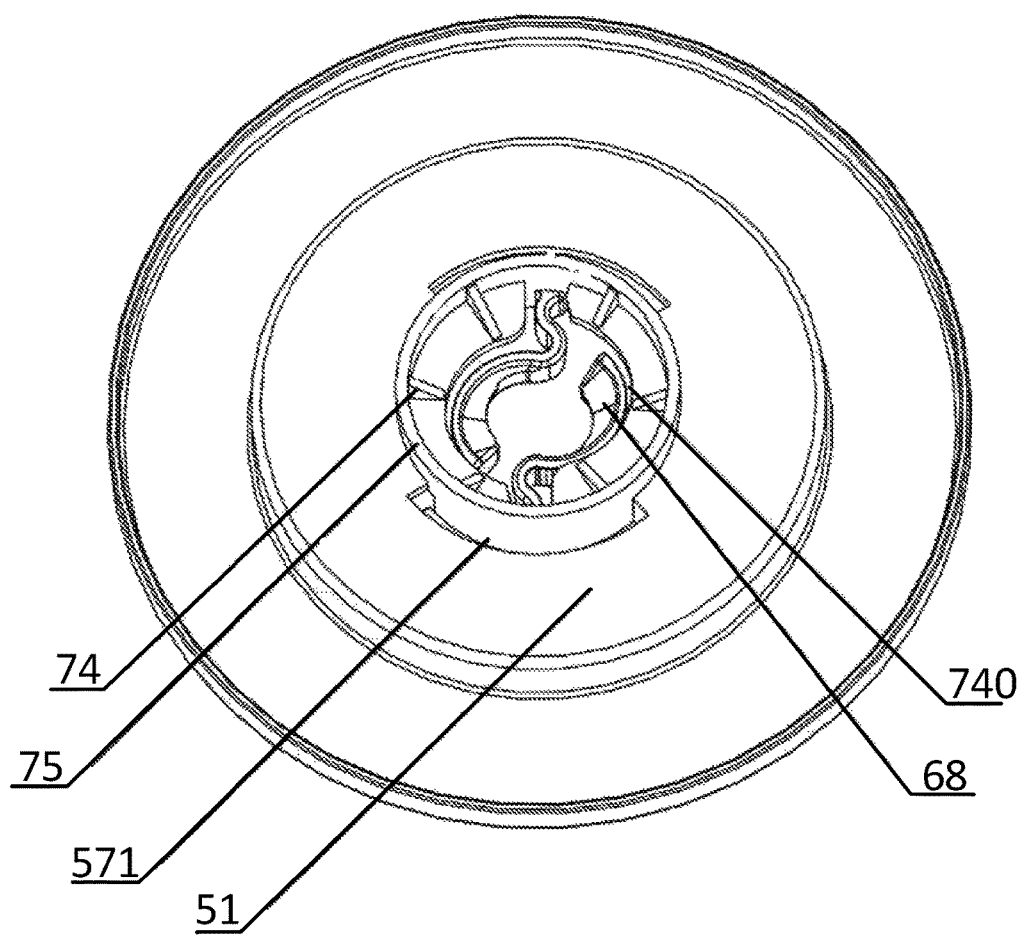
FIG. 11 is a three-dimensional diagram illustrating an angle of an end cap.
Figure 12:
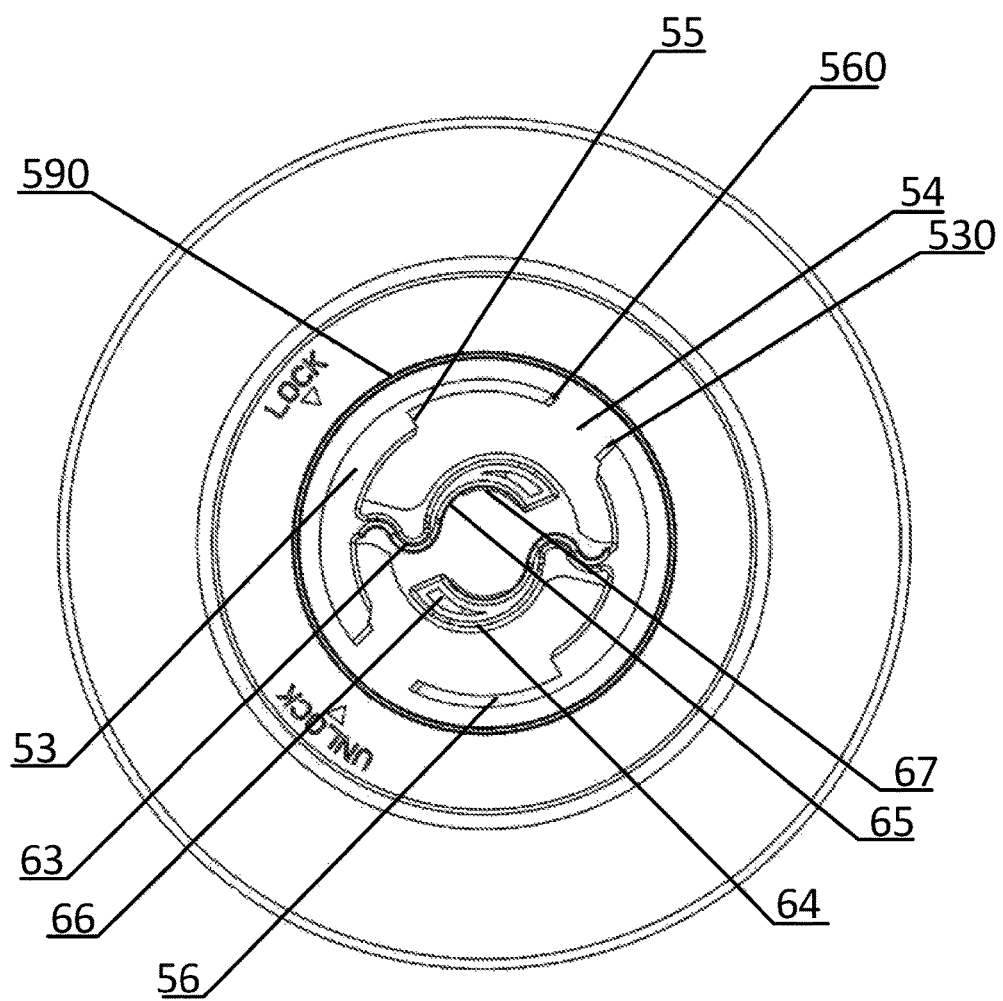
FIG. 12 is a bottom view illustrating an end cap.
Figure 13:
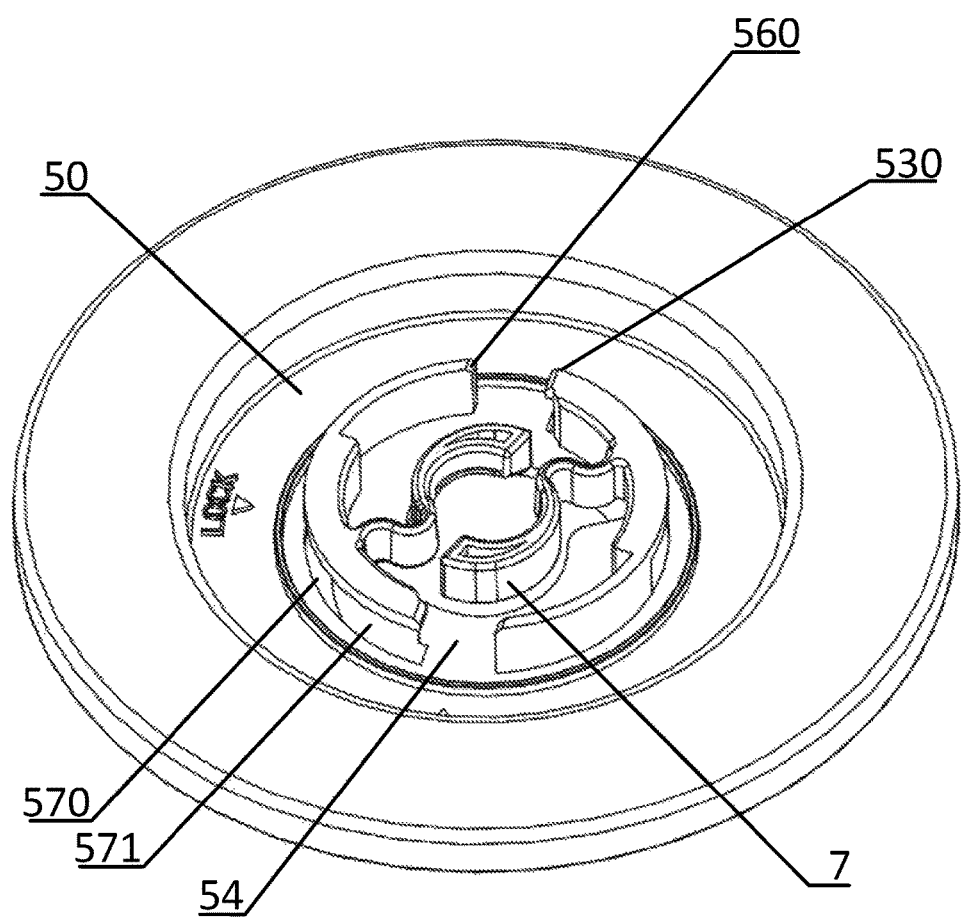
FIG. 13 is a three-dimensional diagram illustrating another angle of an end cap.
Figure 14:
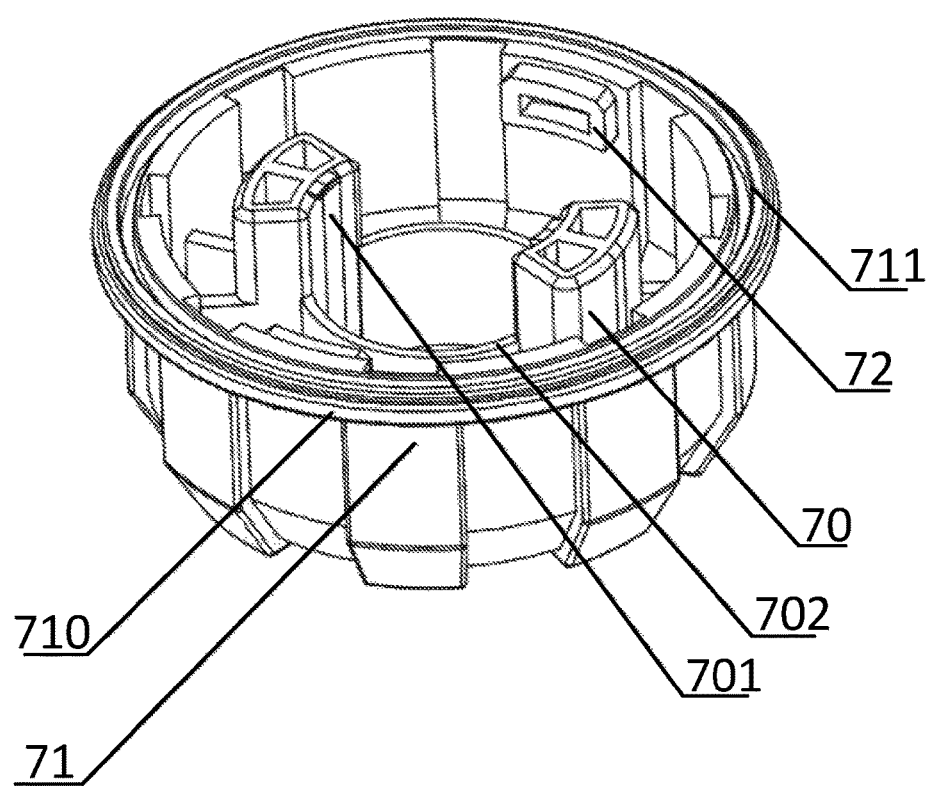
FIG. 14 is a three-dimensional diagram illustrating an angle of a cover body.
Figure 15:
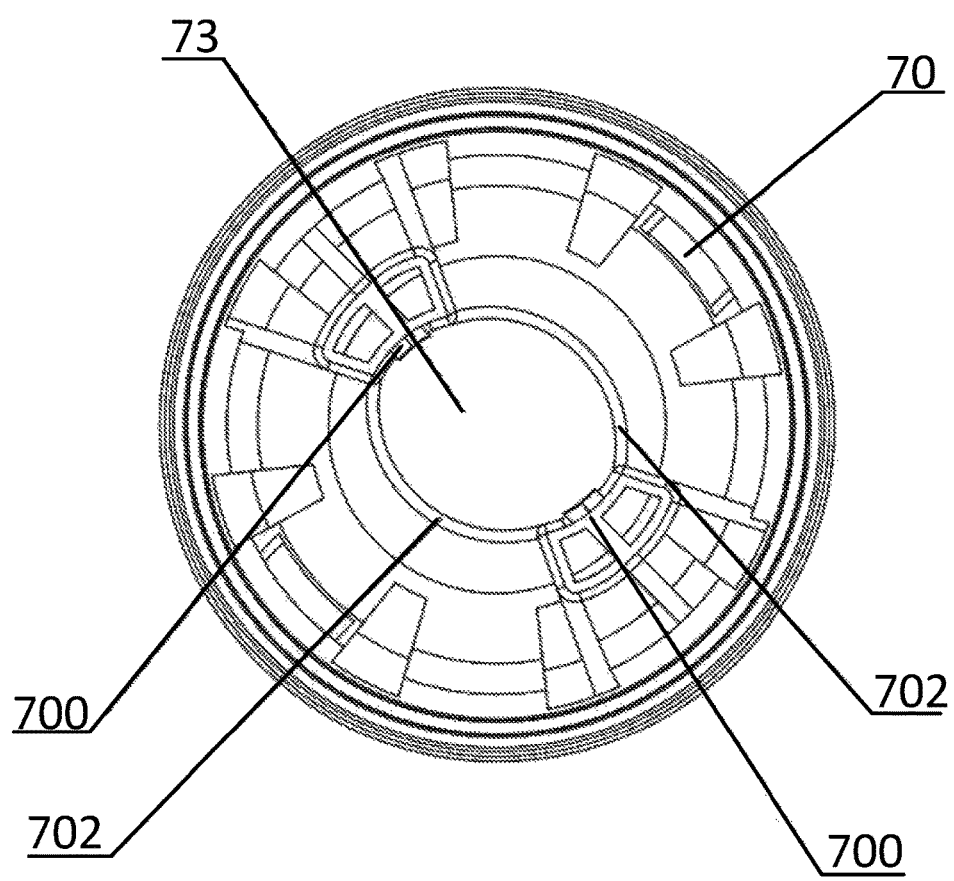
FIG. 15 is a top view illustrating a cover body.
Figure 16:
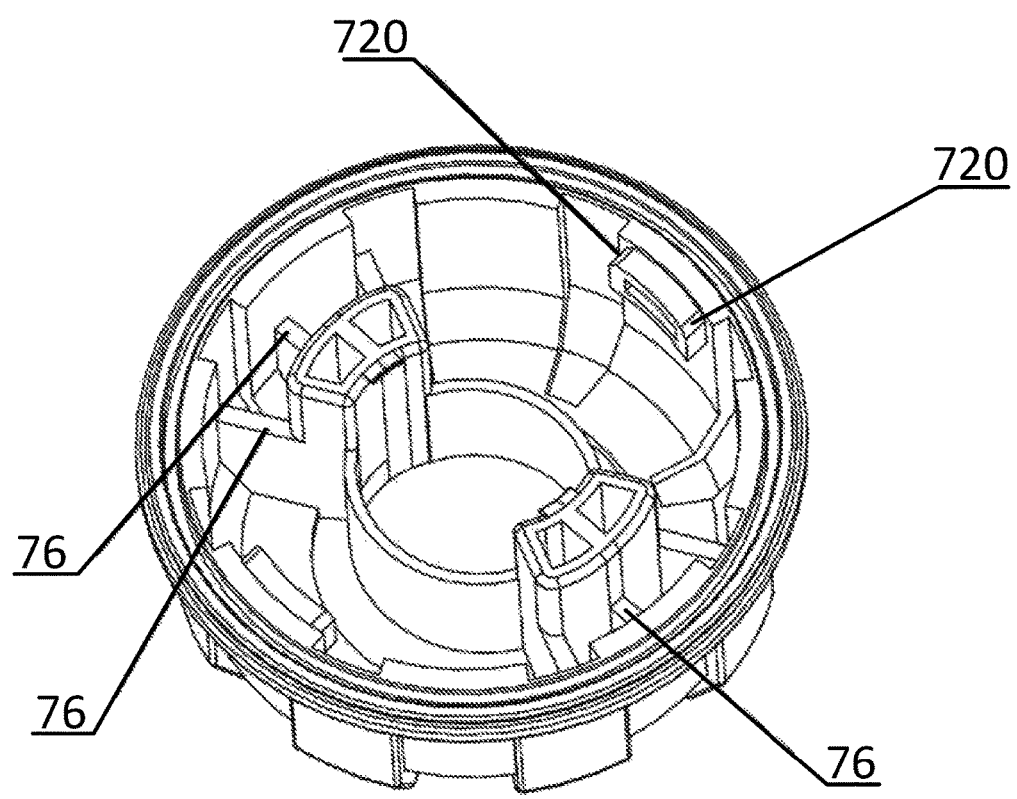
FIG. 16 is a three-dimensional diagram illustrating another angle of a cover body.

The cover body 7 rotates around an axis b penetrating through the end hole 60 and the cover body 7 when rotating. In the implementation manner, the axis b is a central line of the filter cartridge 92 and a central line of the middle column 40, the axis b penetrates through the middle column 40, and the middle column 40 is parallel to the axis b. The cover body 7 is provided with a plurality of pushing parts 70, the pushing parts 70 correspond to the clamping elements 61 one to one, and the pushing parts 70 rotate along with the cover body 7 in the process of the rotation of the cover body 7. The pushing parts 70 press against the corresponding clamping elements 61 toward the middle column 40 when the cover body 7 is in a first position (with reference to FIG. 8; at this time, the middle column 40 is clamped, and bumps 72 are stopped by stopping walls 55.), so that the middle column 40 is clamped by the clamping elements 61; and in a process that the cover body 7 rotates around the middle column 40 from the first position to a second position (with reference to FIG. 9; at this time, the middle column 40 is unclamped, and the bumps 72 are located in openings 54.), the pushing parts 70 rotate along with the cover body 7, and the clamping elements 61 move to the direction facing away from the middle column 40, so as to unclamp the middle column 40. The first position and the second position are proposed in order to facilitate the description of the technical solutions. FIG. 8 and FIG. 9 are only examples, the first position only needs to correspond to a state that the middle column 40 is clamped, and the second position only needs to correspond to a state that the middle column 40 is unclamped.

In the process that the cover body 7 rotates around the middle column 40 along the rotation direction a, the pushing parts 70 rotate along with the cover body 7 to push the corresponding clamping elements 61 to move toward the middle column 40, so that the middle column 40 is clamped by the plurality of clamping elements 61. Each of the clamping elements 61 is provided with a side surface 62 facing away from the middle column 40, and the pushing parts 70 slide along the side surfaces 62 of the corresponding clamping elements 61 and push against the side surfaces 62 to push the corresponding clamping elements 61 to move to the middle column 40 in the process that the cover body 7 rotates around the middle column 40 along the rotation direction a.

Each side surface 62 of each of the clamping elements 61 is a convex surface, and the pushing parts 70 sequentially slide over a first area and a second area on the side surfaces 62 in the process that the cover body 7 rotates along the rotation direction a; and a vertical distance from the second area to the axis b of the cover body 7 is greater than that from the first area to the axis b when the cover body 7 is located at any position between the first position and the second position. The pushing part 70 respectively leans against a third area of convex surface of the corresponding clamping element 61 when the cover body 7 is located in the first position, the pushing part 70 respectively leans against a fourth area of convex surface of the corresponding clamping element 61 when the cover body 7 is located in the second position, and a vertical distance from the third area to axis b of the cover body 7 is greater than that from each of the fourth areas to the axis b when the cover body 7 is located in any position between the first position and the second position.

The area on the side surface 62 on which the pushing part 70 slides includes a line area in a plane vertical to the axis b, namely, the line area is formed by intersection of the plane and the area, on which the pushing part 70 slides, of the side surface 62; in the line area, a vertical distance from a point slid over firstly by the pushing part 70 along the rotation direction a to the axis b is less than that from a point slid over afterward by the pushing part 70 to the axis b when the cover body 7 is located in the first position; in the line area, the vertical distance from the point slid over firstly by the pushing part 70 along the rotation direction a to the axis b is less than that from the point slid over afterward by the pushing part 70 to the axis b when the cover body 7 is located in the second position; and in the line area, the vertical distance from the point slid over firstly by the pushing part 70 along the rotation direction a to the axis b is less than that from the point slid over afterward by the pushing part 70 to the axis b when the cover body 7 is located in any position between the first position and the second position.

The clamping element 61 is overhanging arm integrally connected to the end cap 6 and is in a bending shape, and an extending direction of the clamping elements 61 is vertical to the axis b of the cover body 7. The clamping elements 61 includes an elastic part 63 integrally extending from the end cap 6 and a clamping part 64 further extending from the elastic part 63, and the clamping elements 61 clamp the middle column 40 by the clamping parts 64. The clamping parts 64 move away from the middle column 40 under the effect of elastic force of the corresponding elastic parts 63 in the process that the cover body 7 rotates against the rotation direction a, so as to unclamp the middle column 40. The side surfaces 62 are arranged at the clamping parts 64, and the pushing parts 70 push the clamping parts 64 to move toward the middle column 40 by virtue of deformation of the elastic parts 63. Each of the clamping parts 64 is further provided with a concave surface 65 facing away from the convex surface and a deformation opening 66, the concave surfaces 65 press against the middle column 40 when the middle column 40 is clamped by the clamping elements 61, and the concave surfaces 65 are in an arc shape adaptive to the outline of the middle column 40 and may be in a circular arc shape. The clamping parts 64 are in an arc shape protruding to a direction departing away from the axis b. The deformation opening 66 is located between the convex surface and the concave surface 65 and is configured to reduce deformation of the clamping part 64 when the clamping part 64 is molded. The clamping part 64 is a part of a cam and has an effect similar to the cam; the convex surface is cam surface; the clamping elements 61 are pressed against by the pushing parts 70 toward the middle column 40 or the axis b increasingly in the process that the cover body 7 rotates along the rotation direction a, so that a distance from the clamping element 61 to the middle column 40 is closer and closer, and the middle column 40 is finally clamped by the clamping elements 61; and the closer a distance from an area on the convex surface to a free end of the corresponding clamping element 61 is, the farther a distance from the area to the axis b is.

Each of the clamping elements 61 is further provided with a first stopping rib 67, and the first stopping rib 67 protrudes from the corresponding concave surface 65. The middle column 40 is provided with a head portion 41, the clamping elements 61 clamp the middle column 40 by clamping the head portion 41, the first stopping rib 67 is located at the upper side of the head portion 41 and is at least partially overlapped with a projection of the head portion 41 along the axis b ("the projection along the axis b" means projecting direction of the projection is parallel to the axis b) when the clamping elements 61 are in a state that the head portion 41 is clamped, and according to such design, even if the clamping elements 61 does not have enough friction for the head portion 41 or the middle column 40 is pulled upwards by external force when clamping, the first stopping ribs 67 can block at the upper side of the head portion 41 to prevent the head portion 41 from departing from the clamping elements 61. In the implementation manner, the first stopping ribs 67 are arranged at the clamping parts 64. Each of the clamping elements 61 is further provided with a third guide bevel 68 used for guiding the middle column 40 to be inserted among the clamping elements 61, the third guide bevels 68 incline relative to the axis b and are arranged opposite to the end hole 60 in an inclining manner, and one part of the third guide bevel 68 forms an upper side surface of the first stopping rib 67. The third guide bevels 68 are located at the upper sides of the clamping elements 61 and are arranged at the corresponding clamping parts 64. The first stopping rib 67 and the projection of the head portion 41 along the axis b are staggered when the bumps 72 are located in the openings 54, and at this time, the middle column 40 can be freely inserted among or departed from the clamping elements 61.

The end cap 6 is provided with a sunken area 50 sunken from the outer side of the end cap 6 to the inside of the filter cartridge 92, a bottom plate 51 corresponding to the sunken area 50, a plurality of first side walls 52, baffles 53 bending and extending from the first side walls 52, the openings 54, the stopping walls 55, a plurality of second side walls 56 and a first annular rib 590. The first side wall 52 extends from the bottom plate 51 and is in an arc shape; the second side wall 56 extends from the bottom plate 51 and is in an arc shape; the second side walls 56 are encircled at the periphery of the middle column 40, and an inner diameter of each of the second side walls 56 is greater than an outer diameter of each of the first side wall 52; and the stopping wall 55 is connected between the bottom plate 51 and the baffle 53 and is vertically and integrally connected to the bottom plate 51. The first side walls 52, the second side walls 56, the baffles 53, the openings 54, the stopping walls 55 and the first annular rib 590 are located in the sunken area 50, an outer diameter of the cover body 7 is less than an inner diameter of the sunken area 50, and the cover body 7 is located or partially located in the sunken area 50. The bottom plate 51 is provided with a plurality of though openings 570 which correspond to the baffles 53 and penetrate through the bottom plate 51 at the peripheries of the first side walls 52, the though opening 570 and the baffle 53 are spaced, chute 571 located at the periphery of the first side wall 52 is formed between the though opening 570 and the baffle 53, or the chute 571 located at the periphery of the first side wall 52 is formed in between the bottom plate 51 and the baffle 53, and walls of the chute 571 are formed by the first side wall 52 and the baffle 53. Projection of the baffle 53 along the axis b is covered by projection of the corresponding through opening 570 along the axis b; the baffles 53 are difficult to demould when the baffles 53 are molded since the baffles 53 are located in the sunken area 50, and the through openings 570 are configured to facilitate the demoulding along the axis b when the baffles 53 are molded, so that the baffles 53 are easy to mold; each of the baffles 53 is provided with a first guide bevel 530 used for guiding the bump 72 into the opening 54 and a second guide bevel (not shown in the figures) used for guiding the bump 72 out of the opening 54, and the first guide bevel 530 is located at the lower side of the second guide bevel and is in a ⋀ shape with the second guide bevel; and the bump 72 is limited in the opening 54 after entering the opening 54, and a circumferential dimension of each of the openings 54 is less than that of each of the bumps 72; and a certain external force needs to be exerted when the cover body 7 is disassembled from the end cap 6, and the opening 54 can be propped open to a certain extent by the bumps 72 under the guide of the second guide bevel, so as to depart out of the openings 54. In the implementation manners, the bumps 72 can be engaged into the openings 54 along the axis b during installation. Therefore, the openings 54 have a certain retaining force for the bumps 72, thereby being conductive to retain the cover body 7 on the end cap 6 when the bumps 72 are located at the openings 54; and the two sides of each of the bumps 72 are respectively provided with a sixth guide bevel 720 used for guiding the bump 72 to be put into the opening 54. The baffle 53 and the clamping element 61 are located at the two opposite sides of the first side wall 52; and the baffle 53 radially extends outwards from the first side wall 52. The chutes 571 extend along the circumferential direction of the axis b, and the extending direction of the chutes 571 and the baffles 53 are vertical to the axis b.

The clamping element 61 extends from the first side wall 52, the first side walls 52 are encircled at the periphery of the middle column 40 and are in arc shapes, and the elastic part 63 of the clamping element 61 is integrally connected to the first side wall 52. Outer edges of the second side walls 56 and outer edges of the baffles 53 are located on the same circumference (i.e., an outer diameter of each of the second side walls 56 is equal to that of each of the baffles 53.).

The first side walls 52 and the second side walls 56 are distributed in a staggered manner, the baffles 53 and the second side walls 56 are distributed in a staggered manner, one end of the second side wall 56 and one end of the baffle 53 are spaced, the opening 54 is formed between one end of the second side wall 56 and one end of the baffle 53, each of the stopping walls 55 is provided with a first end side 551 facing away from the middle column 40 and a second end side 550 located between the first end side 551 and the middle column 40, the first side wall 52 extends against the rotation direction a from the second end side 550, and the second side wall 56 extends along the rotation direction a from the first end side 551. The stopping wall 55 and the opening 54 are located at the two opposite ends of the chute 571, and the bump 72 is limited to rotate between the stopping wall 55 and the opening 54, thereby limiting a rotation angle of the cover body 7. Therefore, the cover body 7 cannot rotate by 360 degrees. The stopping wall 55 and the opening 54 are located at the two opposite ends of the baffle 53. Each of the second side walls 56 is provided with a fifth guide bevel 560 used for guiding the bump 72 into the opening 54, the fifth guide bevel 560 and the corresponding first guide bevel 530 are located at the two opposite sides of the opening 54, and the fifth guide bevel 560 and the second guide bevel are located at the two opposite sides of the opening 54.

The cover body 7 is provided with a cover plate 73, an annular side plate 71 integrally connected to the periphery of the cover plate 73 and a plurality of bumps 72 radially extending inwards from the side plate 71. The bump 72 can be put into the opening 54 along a direction parallel to the axis b and then rotates around the axis b into the chute 571 when the cover body 7 is installed; the baffle 53 leans against the bump 72 and is located between the bump 72 and the cover plate 73 when the bump 72 is located in the chute 571; the end part of the side plate 71 radially extends outwards to form an annular flange 710, the flange 710 is provided with an annular groove 711 sunken to a direction away from the bottom plate 51, the end hole 60, the first side walls 52 and the through openings 570 are located in an area encircled by the first annular rib 590, the first annular rib 590 enters the annular groove 711 and presses against the sealing ring 8 in the annular groove 711 to the direction away from the bottom plate 51, and the bump 72 presses against the baffle 53 when being located in the chute 571. The first annular rib 590 may also be arranged at the cover body 7, and correspondingly, the annular groove 711 is arranged at the end cap 6. The end hole 60 is in an irregular shape, projections of the clamping elements 61 along the axis b are covered by a projection of the end hole 60 along the axis b, the clamping elements 61 are difficult to demould when the clamping elements 61 are formed since the clamping elements 61 are located in the sunken area 50, and in this way, the end hole 60 not only is penetrated by the middle column 40, but also have an effect of facilitating demoulding when the baffles 53 are molded, so that the baffles 53 are easy to mold.

A containing cavity is formed by the side plate 71 and the cover plate 73, the pushing parts 70 are contained in the containing cavity and integrally extend upwards from the cover plate 73, and the bumps 72 are contained in the containing cavity and integrally extend from the side plate 71. The pushing part 70 extends along the direction parallel to the axis b, and the bump 72 extends along a direction vertical to the axis b. The baffles 53, the first side walls 52, the second side walls 56 and the clamping elements 61 are contained in the containing cavity. The cover body 7 is further provided with a plurality of reinforcing ribs 76, and the reinforcing ribs 76 are connected between the cover plate 73 and the pushing parts 70 and are also connected between the side plate 71 and the pushing parts 70.

One side of each of the pushing parts 70 facing to the middle column 40 is provided with a second stopping rib 700. The second stopping rib 700 is adjacently located at the upper side of the clamping element 61 and is at least partially overlapped with the projection of the clamping element 61 along the direction parallel to the axis b when the clamping elements 61 are in a state of clamping the middle column 40. Therefore, the middle column 40 drives the clamping elements 61 to deflect upwards due to the friction between the middle column 40 and the clamping elements 61 when the middle column 40 is departed upwards from the clamping of the clamping elements 61 by external force, and the second stopping rib 700 can stop the clamping element 61 to inhibit the clamping elements 61 from deflecting upwards. The second stopping rib 700 leans against the corresponding clamping element 61 or a gap along the direction parallel to the axis b between the second stopping rib 700 and the clamping element 61 is 0 mm to 3 mm and may be 0.5 mm or 1 mm when the clamping elements 61 are in a state of clamping the middle column 40. The second stopping ribs 700 and the projections of the clamping elements 61 along the axis b are staggered when the bumps 72 are located in the openings 54, and the second stopping ribs 700 are in non-interference with the clamping elements 61 when the bumps 72 are put into the openings 54, so that the second stopping ribs 700 do not interfere with the putting of the bumps 72 into the openings 54. Each of the pushing parts 70 is provided with a pressing surface 701 used for pressing against the side surface 62, the pressing surfaces 701 are curved surfaces matched with the side surfaces 62, the second stopping rib 700 protrudes out of the pressing surface 701, the pressing surface 701 can be in a circular arc shape or in a non-circular arc shape, and the pressing surface 701 may be configured in a way that: the closer a distance from an area of the pressing surface 701 to the corresponding elastic part 63 of the corresponding clamping element 61 is, the closer a distance from the area to the axis b is.

The cover body 7 is further provided with third stopping ribs 702 located at the lower sides of the clamping elements 61, the clamping element 61 leans against the corresponding third stopping rib 702 up and down, or an up-and-down gap is formed between each of the clamping elements 61 and the corresponding third stopping rib 702, and the clamping element 61 is partially overlapped with projection of the third stopping rib 702 along the axis b when the clamping elements 61 are in a state of clamping the middle column 40 and/or when the bumps 72 are located in the openings 54, so that the third stopping ribs 702 may stop the clamping elements 61 so as to inhibit the clamping elements 61 from deflecting downwards. A gap along the axis b between the third stopping rib 702 and the clamping element 61 is 0 mm to 3 mm and may be 0.5 mm or 1 mm. The third stopping rib 702 is connects among all the pushing parts 70. The third stopping rib 702 integrally extends from the cover plate 73 along the direction parallel to the axis b and connects among the pushing parts 70.

The end cap 6 is further provided with a plurality of guiding elements 74 and a second annular rib 75. The guiding elements 74 are located at the inner side of the end cap 6 and are distributed at the periphery of the end hole 60, and each of the guiding elements 74 is provided with a fourth guide bevel 740 used for guiding the middle column 40 to be inserted into the end hole 60. The end hole 60 and the guiding elements 74 are located within a range encircled by the second annular rib 75, the guiding elements 74 are integrally connected to the second annular rib 75, projections of the first side walls 52 along the axis b are covered by a projection of the second annular rib 75 along the axis b, the through openings 570 are located at the periphery of the second annular rib 75, and the second annular rib 75 is in a ring shape.

Figure 4:
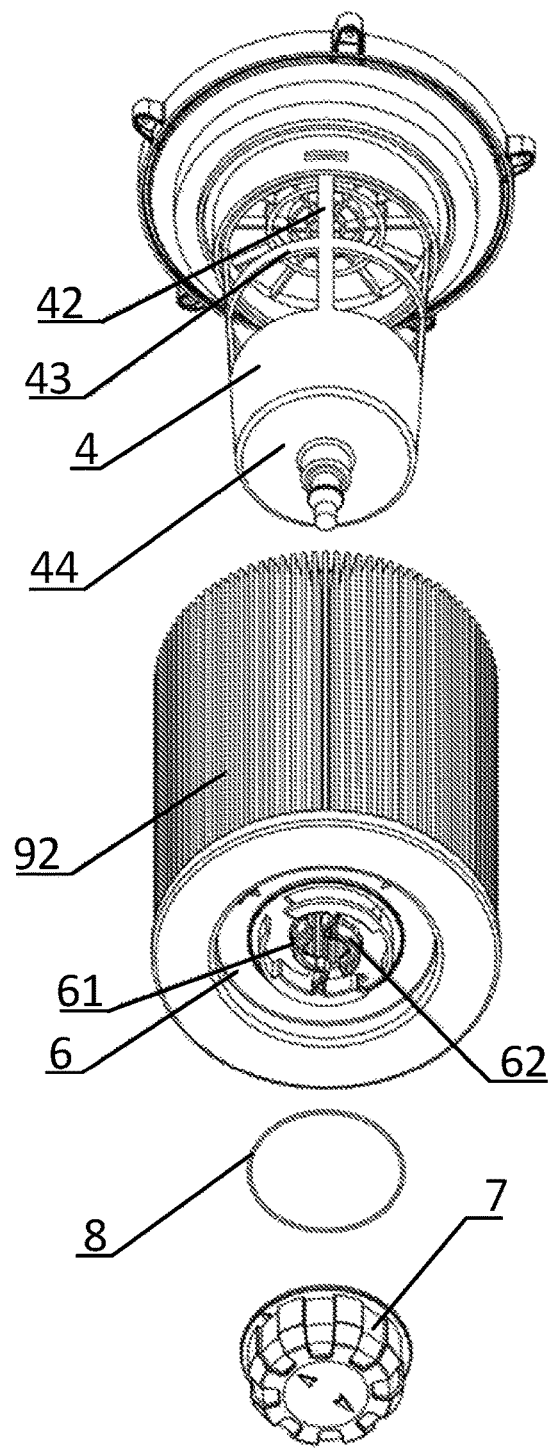
FIG. 4 is an exploded view of FIG. 3.
Figure 5:
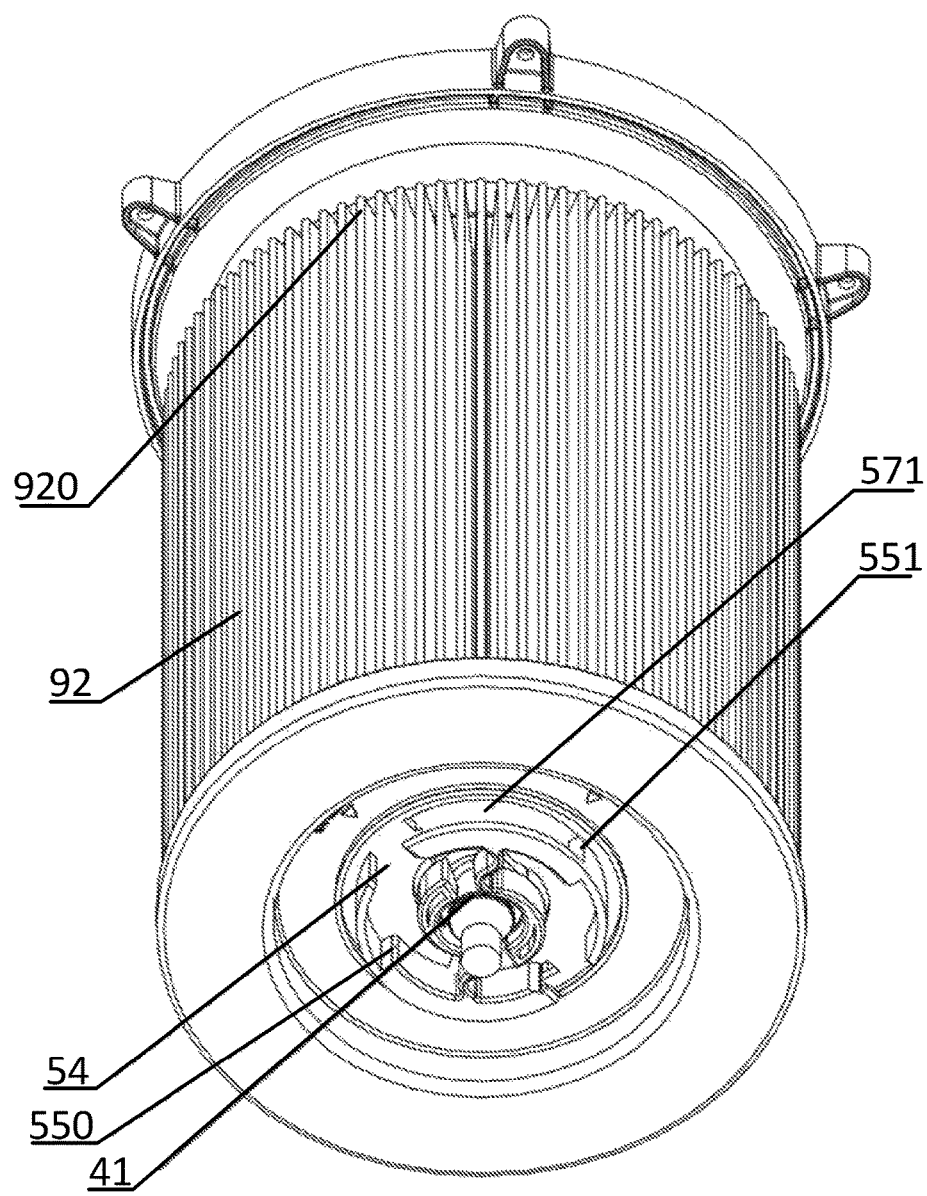
FIG. 5 is a three-dimensional diagram of FIG. 3 after a cover body is removed.
Figure 6:
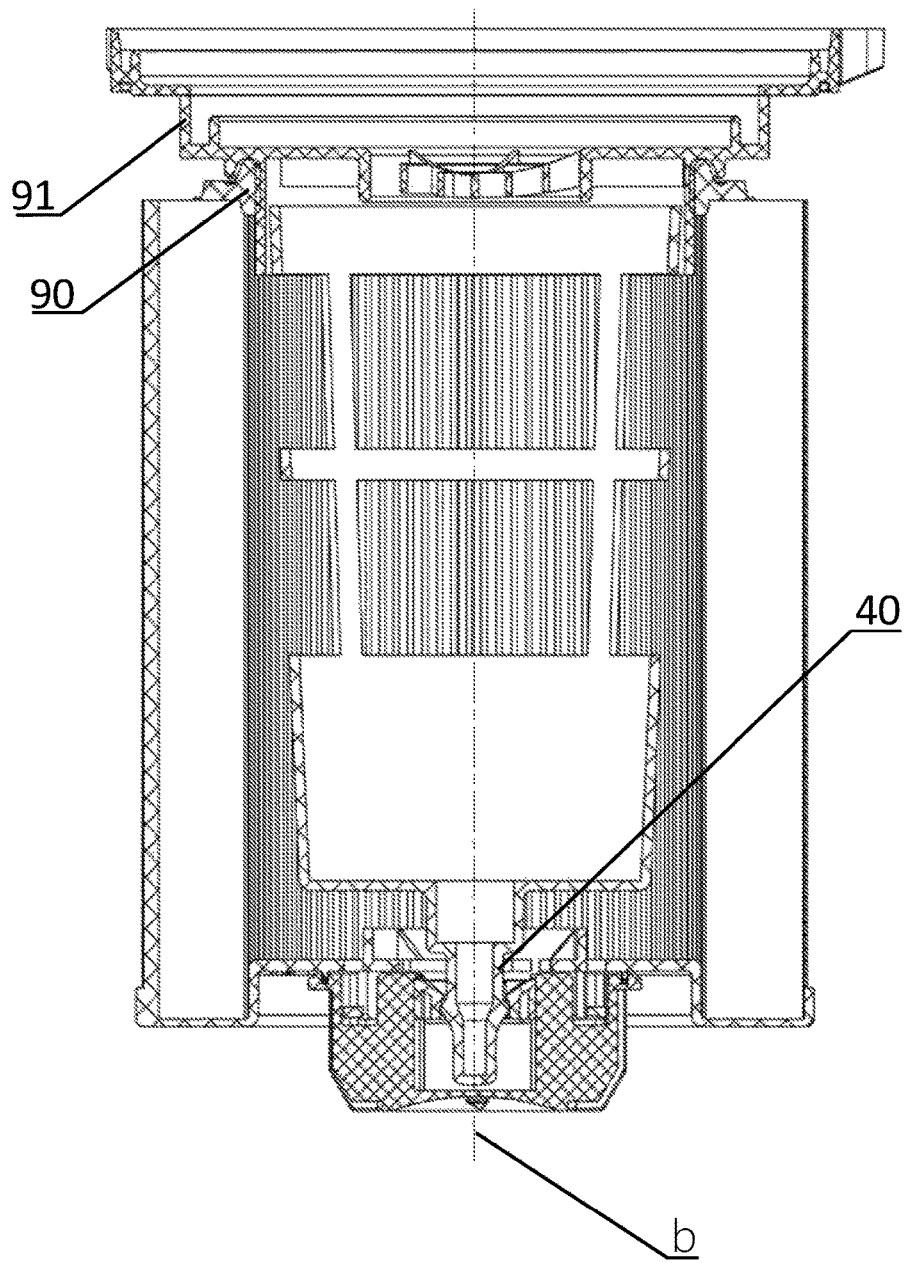
FIG. 6 is a longitudinal section view of an angle of FIG. 3 (a cross section is parallel to an axis b)
Figure 7:
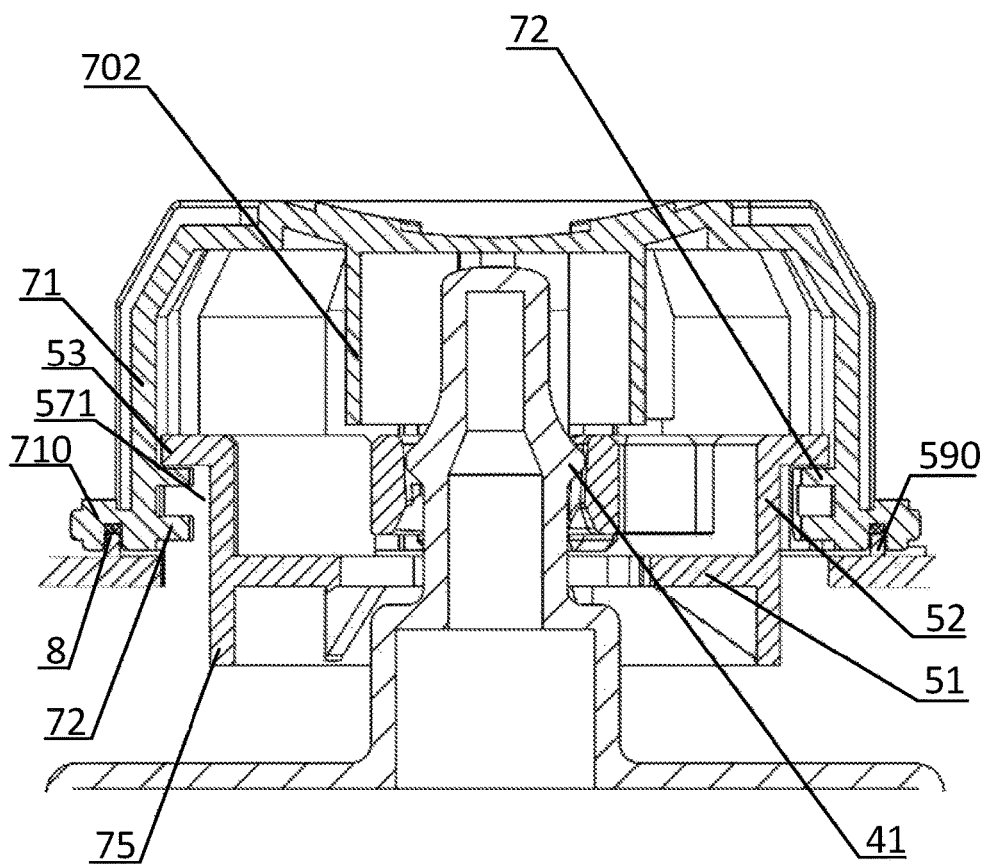
FIG. 7 is a partially amplified longitudinal section view of another angle of FIG. 3 (a cross section is parallel to an axis b)

With reference to FIG. 4 and FIG. 5, the filter cage 4 is in an overall frame shape and is provided with longitudinal ribs 42 longitudinally arranged, annular ribs 43 integrally formed and intersected with the longitudinal ribs 42 and a bottom wall 44, the bottom wall 44 is arranged opposite to the bottom plate 51 at an interval, and the middle column 40 integrally extends from the center of the bottom wall 44. Ridges 920 or wrinkles arranged in an alternating manner are formed on an outer side surface of the filter cartridge 92, and pores for filtering dust are distributed on the outer side surface of the filter cartridge 92.

In the present disclosure, "upper", "lower", "side", "inner" and "outer" are descriptions of corresponding positions of all objects in icons, rather than a limit to components, composition, areas and the like; and for quantity, "a plurality of" are only an example, and the quantity can be set as required.

The above descriptions are only the specific implementation manners of the present disclosure, but the protection scope of the present disclosure is not limited thereto. Those skilled acquainted with the art should understand that the present disclosure includes but not limited to the drawings and the contents described in the above specific implementation manners. Any modification without departing from the function and the structural principle of the present disclosure shall be included in the scope of the claims.

What is claimed is:

1. A filter device, for use in a dust collector, comprising: a filter cage, a filter cartridge sleeved at outer side of the filter cage, and an end cap connected to one end of the filter cartridge; the end cap is provided with a through end hole, and one end of the filter cage corresponding to the end cap is provided with a middle column penetrating through the end hole; and further comprising: a cover body installed at outer side of the end cap; wherein the end cap is provided with a plurality of clamping elements used for pressing against the middle column, and the cover body pushes the clamping elements to move toward the middle column in a process that the cover body rotates around the middle column along a rotation direction, to make the middle column clamped by the plurality of clamping elements.

2. The filter device according to claim 1, wherein the cover body is provided with a plurality of pushing parts used for pushing the clamping elements, and the pushing parts rotate along with the cover body to push corresponding clamping elements to move toward the middle column in a process that the cover body rotates around the middle column along the rotation direction, to make the middle column clamped by the plurality of clamping elements.

3. The filter device according to claim 2, wherein each clamping element is provided with a side surface facing away from the middle column, and the pushing part slides along the side surface of corresponding clamping element and push the side surface to push corresponding clamping element to move toward the middle column in the process that the cover body rotates around the middle column along the rotation direction.

4. The filter device according to claim 3, wherein the side surface is convex surface, an area of the side surface on which the pushing part slides comprises a line area in a plane vertical to an axis of the middle column; and in the line area, a vertical distance from a point slid over firstly by the pushing part along the rotation direction to the axis is less than that from a point slid over afterward by the pushing part to the axis, when the middle column is clamped by the plurality of clamping elements.

5. The filter device according to claim 3, wherein the side surface is convex surface, and the clamping elements are pushed toward the middle column or an axis increasingly in the process that the cover body rotates along the rotation direction, so that a distance from the clamping element to the middle column or the axis is closer and closer, and finally, the middle column is clamped by the clamping elements.

6. The filter device according to claim 1, wherein each of the clamping elements comprises an elastic part integrally extending from the end cap and a clamping part further extending from the elastic part, the clamping elements clamp the middle column by the installed clamping parts, and the clamping part, under the effect of elastic force of corresponding elastic part, moves to a direction facing away from the middle column to =clamp the middle column in a process that the cover body rotates against the rotation direction.

7. The filter device according to claim 6, wherein each clamping element is provided with side surface facing away from the middle column, each of the pushing parts slide along the side surface of corresponding clamping element to push the side surface in the process that the cover body rotates around the middle column along the rotation direction, and the side surface is located at the clamping part.

8. The filter device according to claim 7, wherein the clamping part is provided with a concave surface facing away from the side surface, the concave surfaces press against the middle column when the middle column is clamped by the clamping elements, and the closer a distance from an area of the side surface of each of the clamping elements to the elastic part of the clamping element is, the closer a distance from the area to the axis is.

9. The filter device according to claim 1, wherein either the end cap or the cover body is provided with a first annular rib, the other one is provided with an annular groove matched with the first annular rib, the filter device is further provided with an annular sealing ring contained in the annular groove, and the first annular rib presses against the annular sealing ring.

10. The filter device according to claim 1, wherein the end cap is integrally provided with a plurality of first side walls located at outer side of the end cap, the clamping element integrally extends from corresponding first side wall, the end cap is further provided with baffles extending out of the first side walls and chutes located at inner sides of the baffles, the first side wall and the baffle form as walls of the corresponding chute, the cover body is further provided with bumps located at inner side of the cover body, the bump is rotatable with the cover body along the chute, and the baffle blocks the bump to prevent the cover body from departing from the end cap.

11. The filter device according to claim 10, wherein the cover body is provided with a cover plate and an annular side plate integrally connected to periphery of the cover plate, a containing cavity is formed by the side plate and the cover plate, the bumps is contained in the containing cavity and integrally extend from the side plate, and the clamping elements are contained in the containing cavity.

12. The filter device according to claim 11, wherein the end cap is further provided with openings communicated with the chutes and stopping walls used for stopping the bumps, each of the openings is located at one end of each of the baffles, the bump is enabled to be put into the opening along the direction parallel to the axis and then rotate into the chute around the axis, the stopping wall and the opening are located at two opposite ends of the chute, and the bumps is limited to rotate between the stopping wall and the opening.

13. The filter device according to claim 12, wherein the end cap is further integrally provided with a plurality of second side walls located at outer side of the end cap; the first side walls and the second side walls are distributed in a staggered manner, the baffles and the second side walls are distributed in a staggered manner, one end of the second side wall and one end of the baffle are spaced and the opening is formed therebetween, each of the stopping walls comprises a first end side facing away from the middle column and a second end side located between the first end side and the middle column, the first side wall extend from the second end side against the rotation direction, and the second side wall extend from the first end side along the rotation direction.

14. The filter device according to claim 1, wherein the clamping elements move to a direction facing away from the middle column to unclamp the middle column in the process that the cover body rotates against the rotation direction, the cover body is provided with a cover plate and an annular side plate integrally connected to periphery of the cover plate, a containing cavity is formed by the side plate and the cover plate, the cover body is provided with a plurality of pushing parts used for pushing the clamping elements, and the pushing part is contained in the containing cavity and integrally extends upwards from the cover plate.

15. The filter device according to claim 1, wherein each of the clamping elements is provided with a first stopping rib, the middle column is provided with a head portion, the clamping elements clamp the middle column by clamping the head portion, and the first stopping rib is located at an upper side of the head portion and is at least partially overlapped with a projection of the head portion along the axis when the clamping elements are in a state of clamping the head portion.

16. The filter device according to claim 1, wherein the cover body is provided with a plurality of pushing parts used for pushing the clamping elements, one side of each of the pushing parts which faces to the middle column is provided with a second stopping rib, and the second stopping rib is located at upper side of the clamping element and is at least partially overlapped with projection of the clamping element along the axis when the clamping elements are in a state of clamping the middle column.

17. The filter device according to claim 1, wherein the cover body is provided with third stopping ribs located at lower sides of the clamping elements, the clamping element leans against the third stopping rib up and down, or an up-and-down gap is formed between the clamping element and the third stopping rib, and the clamping element is partially overlapped with projection of the third stopping rib along an axis of the middle column.

18. The filter device according to claim 1; wherein the cover body is provided with a plurality of pushing parts corresponding to the plurality of clamping elements; the pushing parts press against corresponding clamping element towards the middle column when the cover body is located in a first position, so that the middle column is clamped by the plurality of clamping elements; and in a process that the cover body rotates around the middle column against the rotation direction from the first position to a second position, the pushing parts rotate along with the cover body and the plurality of clamping elements move to a direction facing away from the middle column, so as to unclamp the middle column.

19. A dust collector, comprising: a dust bucket and a filter device contained in the dust bucket, wherein the filter device comprises a filter cage, a filter cartridge sleeved at outer side of the filter cage and an end cap connected to one end of the filter cartridge; the end cap is provided with a through end hole, and one end of the filter cage which corresponds to the end cap is provided with a middle column penetrating through the end hole; and further comprising: a cover body installed at outer side of the end cap; the end cap is provided with a plurality of clamping elements used for pressing against the middle column, and the cover body pushes the clamping elements toward the middle column in a process that the cover body rotates around the middle column along a rotation direction, to make the middle column clamped by the plurality of clamping elements.

20. A filter assembly for use in a dust collector, comprising a hollow filter cartridge, and an end cap connected to one end of the filter cartridge and shielding one end of the filter cartridge; wherein the end cap being provided with a through end hole; further comprising: a cover body installed at outer side of the end cap; the end cap shields the end hole, the cover body is rotatable around an axis penetrating through the end hole and the cover body, the cover body is provided with a plurality of pushing parts, the end cap is provided with a plurality of clamping elements corresponding to the plurality of pushing parts, each of the clamping elements is provided with a side surface facing away from the axis, and the pushing parts rotate along with the cover body and slide along the side surfaces of corresponding clamping elements, in a process that the cover body rotates around the axis along a rotation direction, so as to push the corresponding clamping elements to move toward the axis.

* * * * *